(12) United States Patent
Ojima

(10) Patent No.: US 6,883,739 B2
(45) Date of Patent: Apr. 26, 2005

(54) TAPE THREADING MECHANISM

(75) Inventor: Kenichi Ojima, Yonezawa (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 10/109,863

(22) Filed: Apr. 1, 2002

(65) Prior Publication Data

US 2002/0139887 A1 Oct. 3, 2002

(30) Foreign Application Priority Data

Apr. 2, 2001 (JP) .................................... 2001-103402

(51) Int. Cl.[7] .............................................. G11B 15/00
(52) U.S. Cl. .................. 242/332; 242/332.4; 242/332.8
(58) Field of Search .............................. 242/332, 332.4, 242/332.8; 360/95

(56) References Cited

U.S. PATENT DOCUMENTS 5,155,639 A * 10/1992 Platter et al. ................. 360/95
5,542,620 A * 8/1996 Ohshita .................... 242/332.4
5,754,361 A * 5/1998 Sakai et al. .................... 360/95

FOREIGN PATENT DOCUMENTS

| JP | 01292662 A | 11/1989 |
| JP | 03025746 A | 2/1991 |
| JP | 03105758 A | 5/1991 |
| JP | 06168524 A | 6/1994 |
| JP | 08017111 A | 1/1996 |
| JP | 8-96456 | 4/1996 |
| JP | 08195003 A | 7/1996 |

* cited by examiner

Primary Examiner—Kathy Matecki
Assistant Examiner—Sang Kim
(74) Attorney, Agent, or Firm—Young & Thompson

(57) ABSTRACT

In a tape threading mechanism having a threading arm for moving a leader block from a tape cartridge to a take-up reel, the take-up reel is provided with a guide groove having an intrusion port in the vicinity of the outer periphery of the take-up reel so as to guide a leader block toward the take-up center of the take-up reel. One of side walls of the guide groove, against which the tip of the leader block abuts when the leader block intrudes into the guide groove, is formed in such a manner that the leader block can smoothly move into the take-up-center of the take-up reel.

3 Claims, 7 Drawing Sheets

TAPE THREADING MECHANISM

BACKGROUND OF THE INVENTION

1. Field of the Invention

The present invention relates to a tape threading mechanism and, more particularly, to a tape threading mechanism, which is provided in a magnetic tape device, for guiding the tip of a magnetic tape in a tape cartridge to the center of a take-up reel for taking up the magnetic tape.

2. Description of the Related Art

In a magnetic tape device as shown in FIG. 5(a) and 5(b), a tape threading mechanism has been conventionally used in which the tip of a magnetic tape 101a is drawn out of a tape cartridge 101, and then, is moved to the center of a take-up reel 102 for taking up the magnetic tape 101a. The tape threading mechanism in the prior art will be explained below in reference to FIGS. 5 to 7.

FIGS. 5(a) and 5(b) are views showing the configuration of a tape threading mechanism in the prior art, wherein FIG. 5(a) is a plan view showing the configuration of the tape threading mechanism and FIG. 5(b) is a schematic view showing the tape threading mechanism shown in FIG. 5(a) as viewed from the front.

The tape threading mechanism in the prior art comprises a tape cartridge 101, around which a magnetic tape 101a is wound, a take-up reel 102 for taking up the magnetic tape 101a, a leader block 103 being fixed to the tip of the magnetic tape 101a and having a predetermined length; and a threading arm 104, which can turn, for moving the leader block 103 to the take-up reel 102. These constituent elements are mounted on a base B.

The threading arm 104 can be turned by a threading motor 104a. The threading motor 104a is securely mounted on the base B. Furthermore, the threading arm 104 is constituted of two pieces of arm members 104b and 104c connected to each other in a turning manner. That is to say, to the threading motor 104a is connected the first arm member 104b, to the end of which is connected to the second arm member 104c serving as a link mechanism in a turning manner. Moreover, to the tip of the second arm member 104c is fixed a threading pin 104d for latching the leader block 103 thereto and moving the leader block 103 to the take-up reel 102. Additionally, guide rollers G11, G12, G13 and G14, a magnetic head H and the like are securely mounted on the base B.

Furthermore, the take-up reel 102 is provided with a guide groove 105 having an intrusion port in the vicinity of the outer periphery of the take-up reel 102 and guiding the leader block 103 toward the take-up center through the intrusion port. The width of the guide groove 105 in the vicinity of the intrusion port is formed in such a manner as to become greater than that in the vicinity of the take-up center. For example, as shown in FIG. 5(a), the width of the guide groove 105 in the vicinity of the intrusion port is formed in such a manner as to diverge in the outer peripheral direction from the center of the take-up reel. In the diverging groove, both of side walls defining the groove diverge in a symmetrical fashion.

Hereinafter, a description will be given of the operation of the tape threading mechanism in the prior art in reference to FIGS. 5 to 7. FIG. 6 is a view illustrating the movement trajectory of the leader block 103, and FIGS. 7(a) and 7(b) are views illustrating the operation when the leader block 103 intrudes into the guide groove 105.

First of all, when the tape cartridge 101 is set by means of a manual or automatic separate mechanism, the threading pin 104d which stands by at a position X is fitted to the leader block 103. At this moment, the leader block 103 can be freely rotated with respect to the axial of the threading pin 104d. When the threading pin 104d is fitted to the leader block 103, the threading motor 104a begins rotating. Consequently, the drive of the threading arm 104 enables the leader block 103 to be moved from the position X to another position Y (see FIG. 5(a)).

FIG. 6 illustrates the operation of the threading arm 104 at this moment.

The leader block 103 is moved on the same trajectory as that of the tip of the threading pin 104d, which is adapted to be moved on a predetermined curve along a cam groove, which has been previously formed. The cam groove, that is, the trajectory of the threading pin 104d is indicated by reference character Ta in FIG. 6. Moreover, the positions of the leader block 103 during the movement are designated in sequence by reference numerals P11, P12, P13, P14 and P15.

In this manner, the leader block 103 approaches the position Y while passing in front of the guide roller G11, the guide roller G12, the magnetic head H, the guide roller G13 and the guide roller G14 in order. The orientation of the leader block 103 is corrected in the vicinity of the position P13, and thus, the leader block 103 reaches the position P14, and then, the position P15. Thereafter, the magnetic tape 101a fixed to the leader block 103 is taken up in the take-up reel 102.

At this time, as shown at the positions P13 and P14 in FIG. 6, the orientation of the leader block 103 is changed in parallel to the direction of the guide groove 105 by increasing the turning variation of the trajectory of the threading pin 104d. Finally, the leader block 103 is inserted into the guide groove 105, as illustrated in FIG. 7(a).

However, the prior art has been disadvantageous as described below: first, since the turning variation is increased in order to correct the orientation of the leader block, it has taken too much time for a threading operation; second, since the trajectory of the threading pin draws a complicated curve, it has been necessary to configure the threading arm of two pieces of complicated link mechanisms in order to satisfy such a complicated trajectory; and third, in view of the above-described second disadvantage, since the two threading arms can be freely rotated with respect to each other, it has been necessary to provide a cam groove mechanism having the same trajectory as that of the threading pin in order to correct the rotations of the two threading arms, thereby causing an increase in cost of the threading mechanism.

In the case in which the movement trajectory of the leader block is shortened so as to overcome the above-described disadvantages, namely, the orientation of the leader block when it intrudes into the guide groove is not corrected, the leader block intrudes into the guide groove with an inclination with respect to the direction of the guide groove. In this case, as shown in FIG. 7(b), the leader block is caught in the vicinity of the guide groove, so that the leader block cannot be reliably moved to the center of the take-up reel, thus raising a problem that the magnetic tape cannot be taken up, and further, predetermined information cannot be read from or written in the magnetic tape.

SUMMARY OF THE INVENTION

The present invention has been accomplished to overcome the above-described disadvantages experienced in the prior art. It is an object of the present invention to provide a tape threading mechanism in which a leader block can be readily moved to the center of a take-up reel while simplifying the configuration of the mechanism per se.

In order to achieve the above-mentioned object, the present invention basically adopts the technological constitutions described below.

Specially, the first aspect of the present invention is a tape threading mechanism comprising: a tape cartridge, in which a magnetic tape is wound; a take-up reel for taking up a magnetic tape within the tape cartridge; a leader block for fixing to a tip of the magnetic tape; and a threading arm for moving the leader block from the tape cartridge to the take-up reel; and a guide groove, provided in the take-up reel, for guiding the leader block toward a take-up center from an intrusion port in the vicinity of an outer periphery of the take-up reel.

With this configuration, first, the threading arm is turned, so that the leader block moves from the tape cartridge to the intrusion port of the guide groove formed at the take-up reel. At this time, the tip of the leader block, which is oriented in a predetermined direction, abuts against one of side walls of the guide groove along the turning trajectory of the threading arm with a predetermined intrusion angle. And further, since this intrusion angle between one of side walls and the leader block is small, friction force when the leader block abuts against one side wall becomes smaller. Consequently, the leader block abuts against one side wall of the guide groove without any catch, and thus, it can move toward the take-up center of the take-up reel along the guide groove. As a result, since it is unnecessary to correct the orientation of the leader block before the intrusion into the guide groove, it is possible to suppress complication of the mechanism of, for example, the threading arm, and further, to readily move the leader block toward the center of the take-up reel.

In the second aspect of the present invention, the other side wall of the intrusion port of the guide groove is formed in a curved shape.

Consequently, even in the case in which the side surface of the leader block which intrudes into the guide groove abuts against the other side wall of the guide groove, it is possible to suppress a damage on the leader block, and further, to smoothly move the leader block toward the take-up center of the take-up reel.

The third aspect of the present invention is a tape threading mechanism comprising: a tape cartridge, in which a magnetic tape is wound; a take-up reel for taking up a magnetic tape within the tape cartridge; a leader block for fixing to a tip of the magnetic tape; and a threading arm for moving the leader block from the tape cartridge to the take-up reel; and a guide groove, provided in the take-up reel, for guiding the leader block toward a take-up center from an intrusion port in the vicinity of an outer periphery of the take-up reel; wherein the threading arm being formed of a piece of arm member.

With this configuration, it is possible to reliably move the leader block to the take-up center of the take-up reel, simplify the configuration, and suppress an increase in cost of the mechanism per se.

BRIEF DESCRIPTION OF THE DRAWINGS

FIGS. 1(a) and 1(b) are views showing the configuration of a tape threading mechanism in a preferred embodiment according to the present invention, wherein FIG. 1(a) is a plan view showing the tape threading mechanism and FIG. 1(b) is a schematic view showing the tape threading mechanism shown in FIG. 1(a) as viewed from the front;

FIGS. 4(a) and 4(b) are views illustrating the state in which the leader block shown in FIGS. 1(a) and 1(b) intrudes into a guide groove formed at the take-up reel, wherein FIG. 4(a) is a view illustrating the shape of the guide groove formed at the take-up reel and FIG. 4(b) is a view stepwise illustrating the operation when the leader block intrudes into the guide groove;

FIGS. 5(a) and 5(b) are views showing the configuration of a tape threading mechanism in the prior art, wherein FIG. 5(a) is a plan view showing the configuration of the tape threading mechanism and FIG. 5(b) is a schematic view showing the tape threading mechanism shown in FIG. 5(a) as viewed from the front;

FIGS. 7(a) and 7(b) are views illustrating the operation when the leader block intrudes into a guide groove, wherein FIGS. 7(a) and 7(b) are views illustrating operational examples.

DESCRIPTION OF THE PREFERRED EMBODIMENT

Figure 1A:
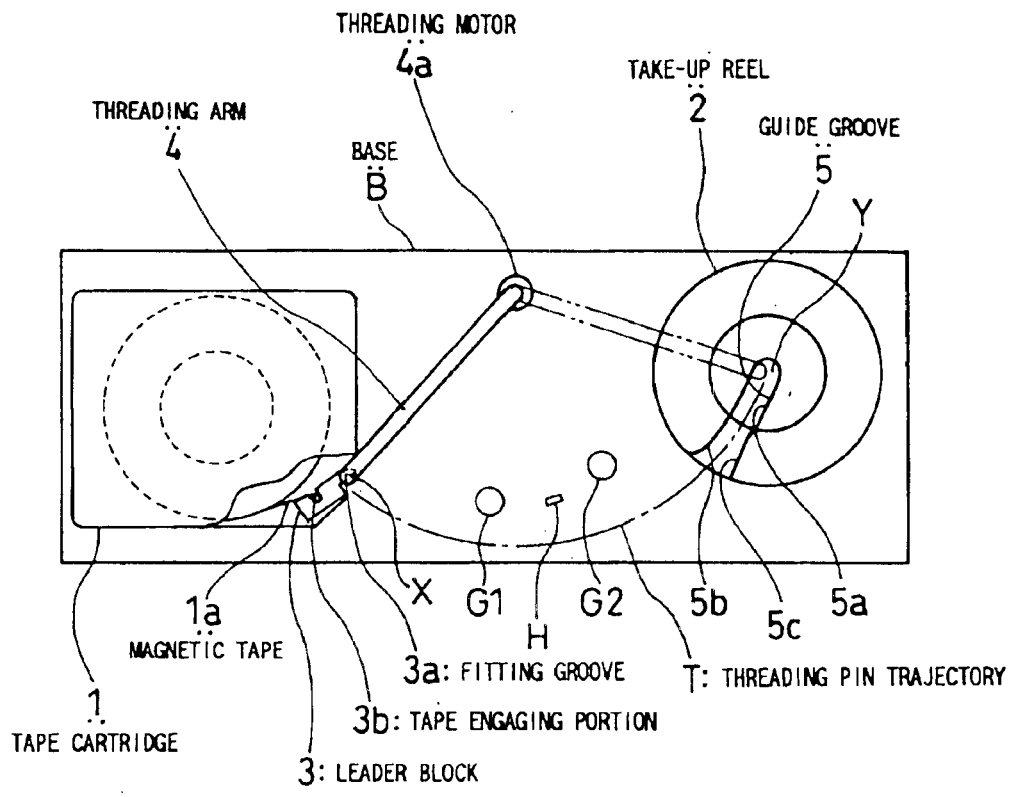
Figure 1B:
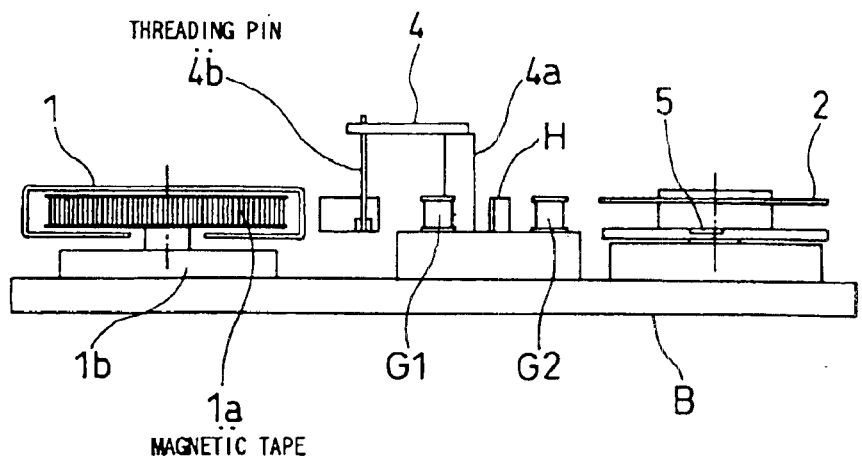

A tape threading mechanism in one preferred embodiment according to the present invention will be described below in reference to FIGS. 1 to 4. FIG. 1(a) is a plan view showing the configuration of a tape threading mechanism, and FIG. 1(b) is a schematic view of the mechanism as viewed from the front. The tape threading mechanism according to the present invention is incorporated inside of a magnetic tape device, and is adapted to move a leader block fixed to the tip of a magnetic tape to a take-up reel, so as to take up the magnetic tape housed inside of a tape cartridge by means of the take-up reel.

As shown in FIG. 1(a), the tape threading mechanism according to the present invention comprises a tape cartridge 1, in which a magnetic tape 1a is wound, a take-up reel 2 for taking up the magnetic tape 1a, a leader block 3 being fixed to the tip of the magnetic tape 1a and having a predetermined length; and a threading arm 4, which can turn, for moving the leader block 3 to the take-up reel 2. These constituent elements are mounted on a base B, which is made of a predetermined flat plate and is housed inside of a magnetic tape device.

Hereinafter, a description will be given in detail of the tape threading mechanism according to the present invention.

The tape cartridge 1 is adapted to wind up therein the magnetic tape 1a having a predetermined memory capacity and hold the magnetic tape 1a therein. Furthermore, a cartridge motor 1b is provided for driving the tape cartridge 1. The cartridge motor 1b is fixed onto the base B, for rotating and driving the tape cartridge 1. In particular, the cartridge motor 1b also drives the tape cartridge 1 in order to apply back tension to the magnetic tape 1a. (The back tension will be described later.)

At the tip of the magnetic tape 1a is provided the leader block 3 formed into a substantially rectangular shape. A fitting groove 3a, to which a threading pin 4b disposed at the tip of the threading arm 4, described later, is fitted, is formed at one end of the substantially rectangular leader block 3 in the longitudinal direction. A tape engaging portion 3b able to be engaged with the magnetic tape 1a is provided in the vicinity of the other end of the leader block 3.

The threading arm 4 is constituted of a piece of arm member. The threading arm 4 is pivotally supported at one end thereof by a threading motor 4a disposed at a predetermined position on the base B. The threading motor 4a applies rotating force to the threading arm 4. To the other end of the threading arm 4 is fixed a rod-like threading pin 4b extending downward. The threading pin 4b is designed to be fitted in the vicinity of the rod-like tip thereof (that is, in the vicinity of the lower end in FIG. 1(b)) into the above-described fitting groove 3a formed at the leader block 3. At this time, in the fitted state, the leader block 3, in a rotating manner, engages with the threading pin 4b serving as an axis. In other words, the above-described fitting groove 3a formed at the leader block 3 is a cylindrical groove having a cutout portion at a part thereof.

The leader block 3 moves on a trajectory T (which is arcuate) of the threading pin 4b in the case where the threading arm 4 is pivoted on the threading motor 4a. Here, the take-up reel 2 is arranged on the base B in such a manner that an intrusion port formed at a guide groove 5, described later, is located on the movement trajectory (i.e., the threading pin trajectory T) of the leader block 3.

The take-up reel 2 is adapted to take up the magnetic tape 1a wound in the tape cartridge 1. Consequently, the take-up reel 2 is provided with a motor for rotating and driving the reel 2 itself, and is mounted on the base B in the same manner as the above-described cartridge motor 1b.

The shape of the take-up reel 2 is formed in such a manner as to have a circular shaft at the center thereof. Moreover, the shaft is vertically held between disk plates, each having a predetermined thickness. The width of the portion held between the disk plates is substantially the same as that of the magnetic tape 1a.

The guide groove 5, which has the intrusion port in the vicinity of the outer periphery of the take-up reel 2 and guides the leader block 3 toward the take-up center from the intrusion port, is formed inside of the take-up reel 2 and at the lower disk plate thereof. The guide groove 5 having a predetermined depth is formed toward the center of the take-up reel 2, and a block receiving area, not shown, containing the leader block 3 therein is provided inside of the take-up reel 2. In other words, the substantially linear block receiving area having a width greater than that of the leader block 3 is provided in the vicinity of the center of the take-up reel 2. The length in the longitudinal direction of the block receiving area is almost the same as that of the leader block 3 in the longitudinal direction. The guide groove 5 and the block receiving area are formed on the threading pin trajectory T in such a manner as to contain therein the leader block 3 moving according to the movement of the threading pin 4b. Furthermore, a cutout (not shown), substantially in conformity with the guide groove 5 is formed at the upper disk plate of the take-up reel 2 in such a manner that the threading pin 4b can move.

On a side wall of the groove 5, outside of the arcuate threading pin trajectory T, a curved surface 5a is provided in conformity with the threading pin trajectory T.

The width of the guide groove 5 formed at the lower disk plate in the vicinity of the intrusion port is formed in such a manner as to become greater than the groove width in the vicinity of the take-up center. Specifically, a side wall 5b of the groove 5 provided in the vicinity of the intrusion port and inside of the threading pin trajectory T is formed at a position nearer the threading motor 4a. Moreover, the wall surface of the side wall 5b is formed into a curved shape.

In contrast, another side wall 5c opposite to the above-described side wall 5b, that is, outside of the threading pin trajectory T is formed into a shape extending from the substantially linear groove.

Here, explanation will be totally made on the shape of the guide groove 5. The basic shape of the guide groove 5 is substantially linear toward the center from a predetermined portion on the outer periphery of the circular take-up reel 2. The side wall in the vicinity of the center, i.e., the portion 5a located outside of the threading pin trajectory T is cut out in an arcuate shape outward of the threading pin trajectory T. The side wall in the vicinity of the outer periphery of the take-up reel 2, i.e., the portion 5b located inward of the threading pin trajectory T is cut out inward. That is to say, the width of the guide groove 5 in the vicinity of the intrusion port is set to become greater than that inward of the trajectory T. Moreover, the surface of the side wall 5b is formed into a curved shape having a projection which protrudes toward the groove 5. Incidentally, the guide groove 5 is not limited to the above-described shape.

Here, on the above-described base B are further mounted guide posts G1 and G2 for supporting the magnetic tape 1a, a magnetic head H for reading or writing predetermined information from or on the magnetic tape 1a, and the like.

Figure 2:
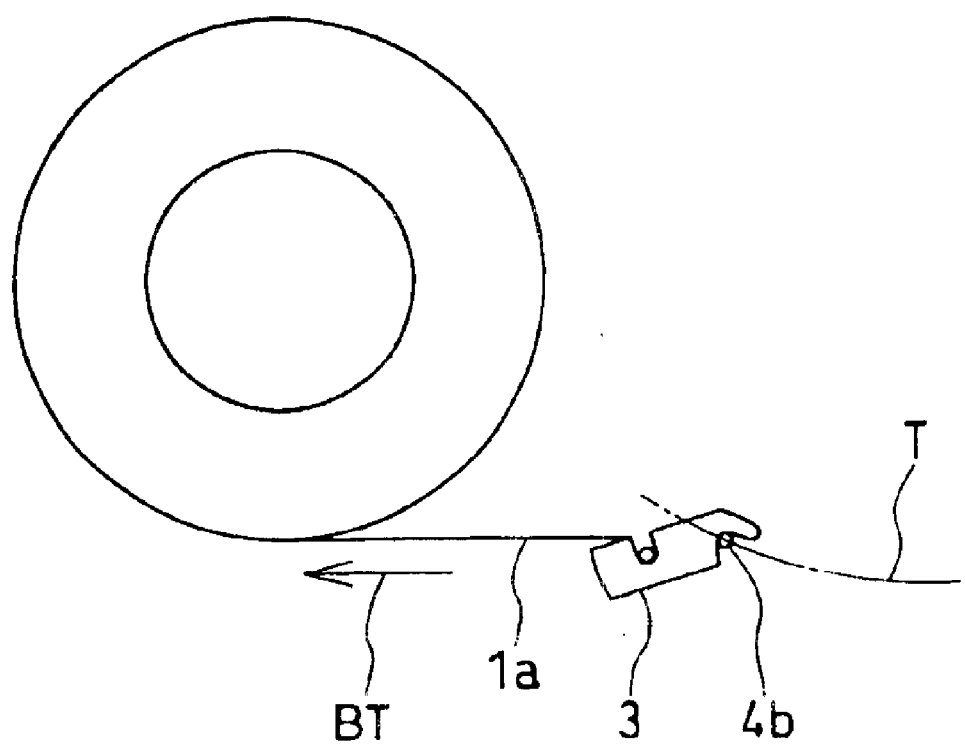
FIG. 2 is a view illustrating the state in which a leader block is drawn out of a tape cartridge shown in FIGS. 1(a) and 1(b)
Figure 3:
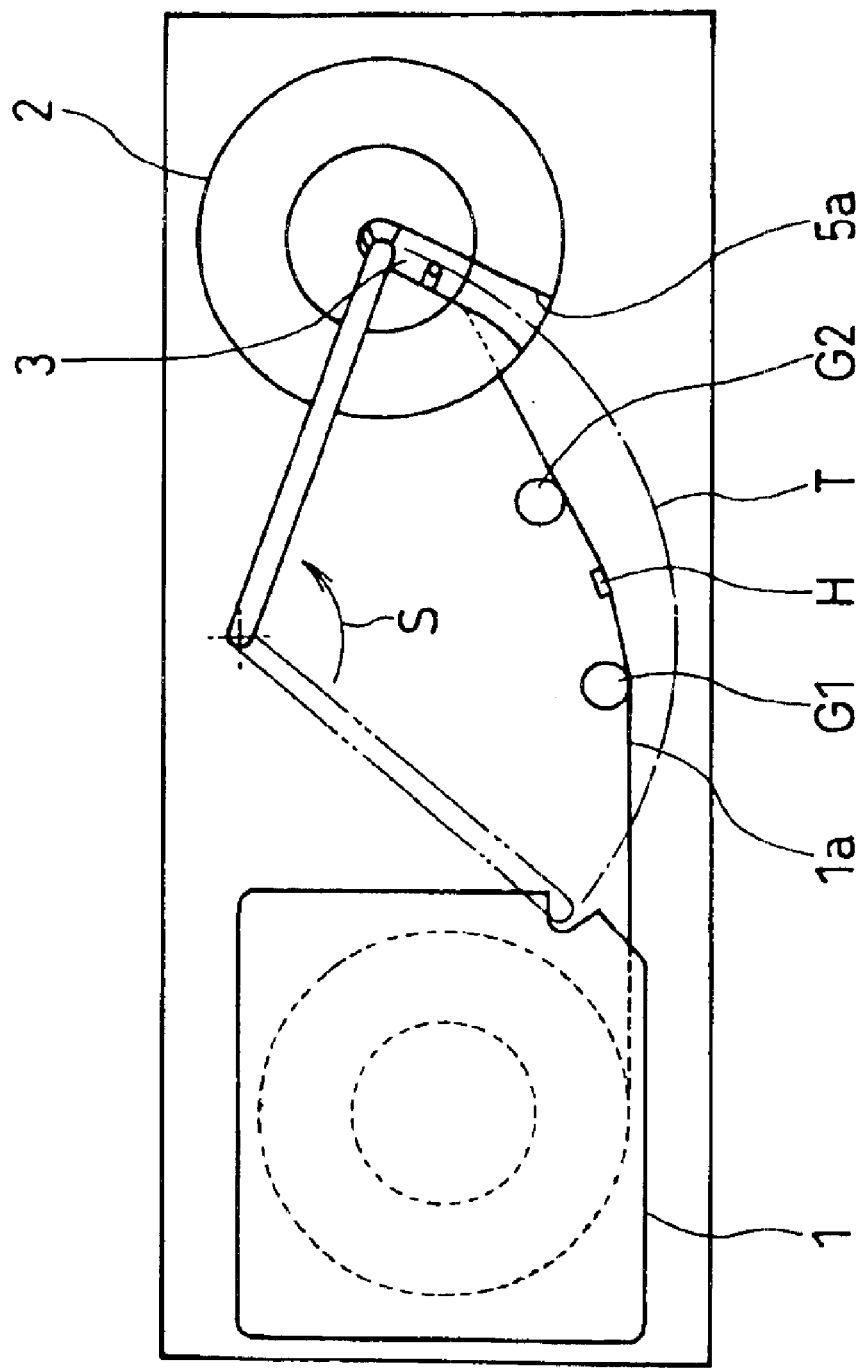
FIG. 3 is a view illustrating the state in which the leader block shown in FIGS. 1(a) and 1(b) moves toward a take-up reel.
Figure 4C:
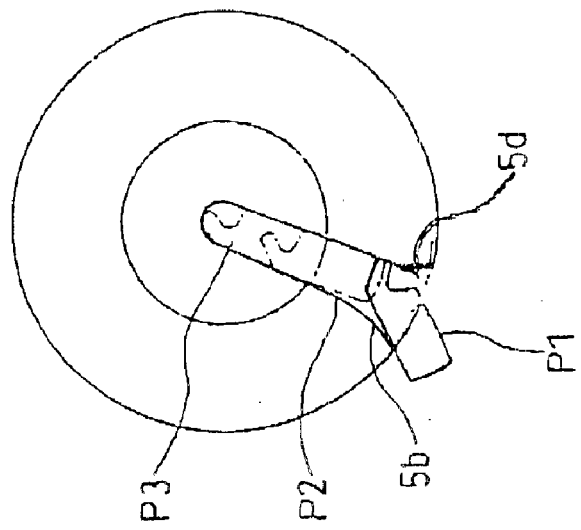
FIG. 4(c) illustrates the curvature 5d of the outer part of the guide groove of the prior art.
Figure 4B:
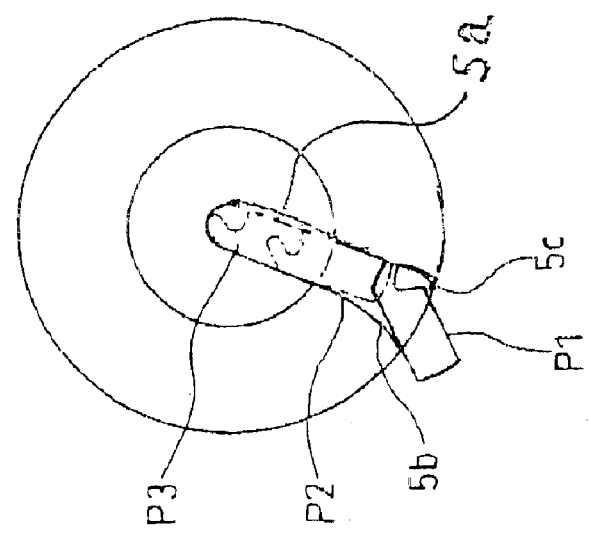
Figure 4A:
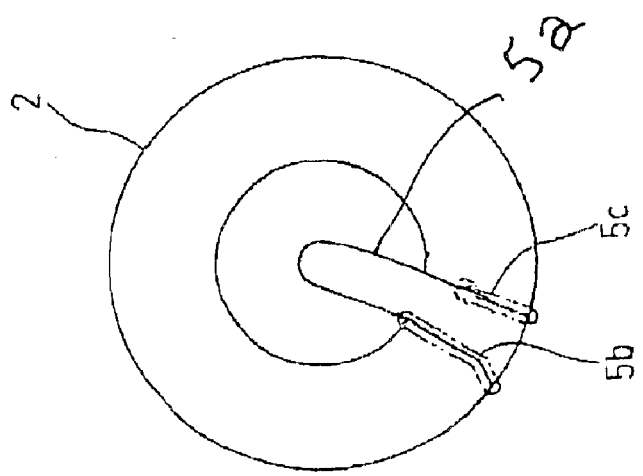
Figure 5A:
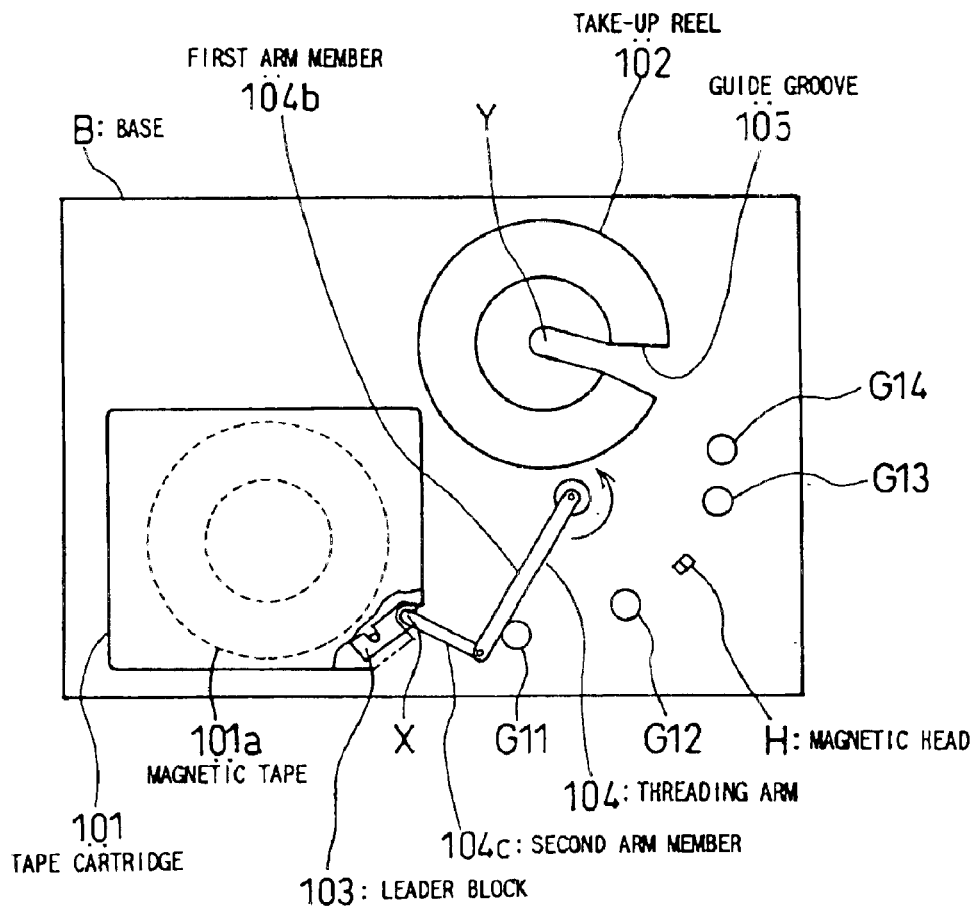
Figure 5B:
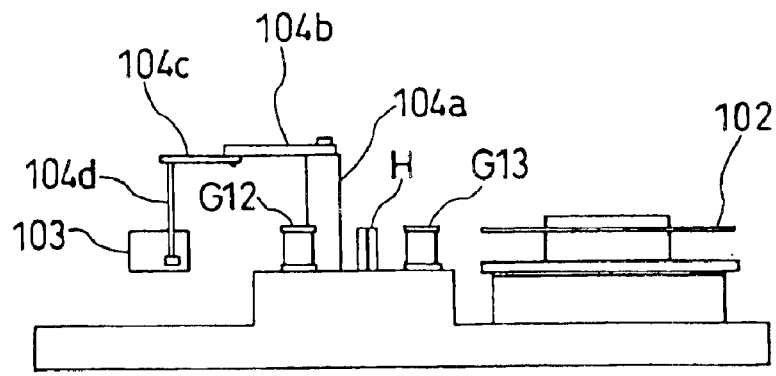
Figure 6:
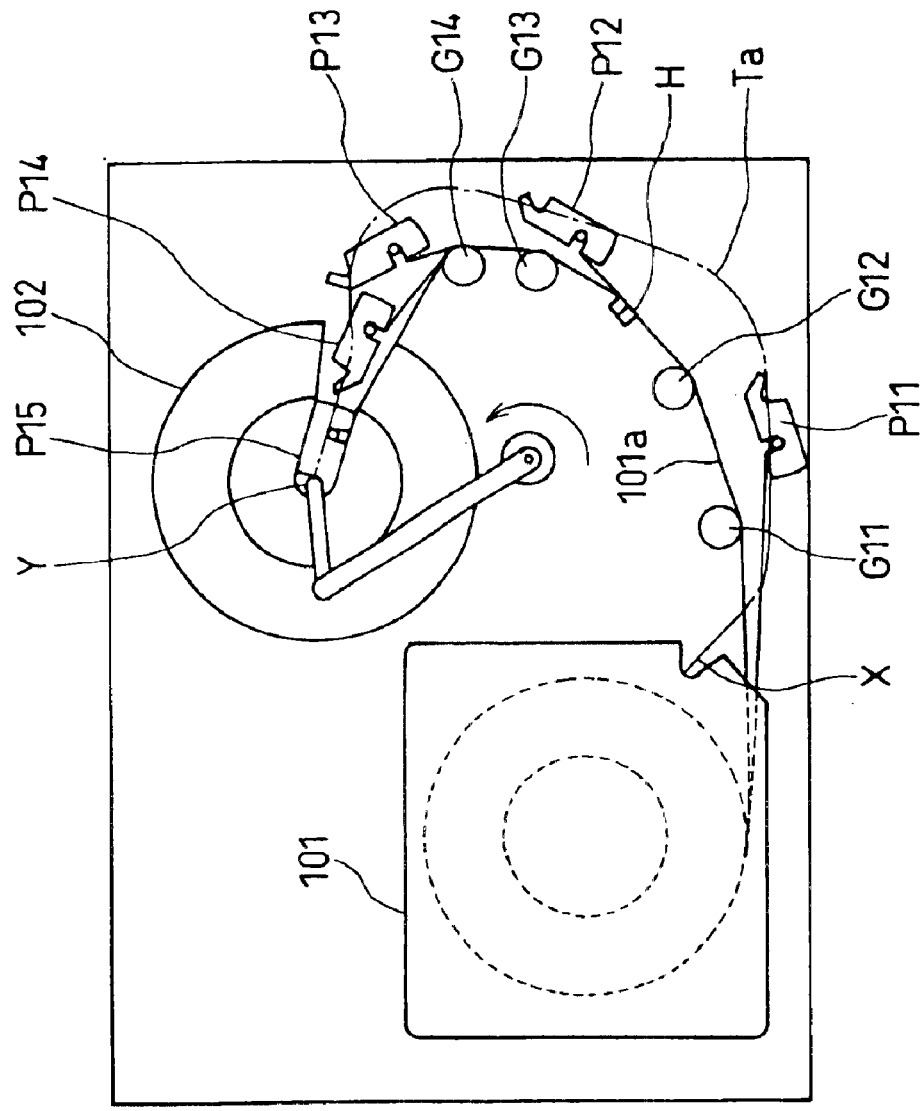
FIG. 6 is a view illustrating the operation of the tape threading mechanism in the prior art, and particularly, illustrating the movement trajectory of a leader block.
Figure 7A:
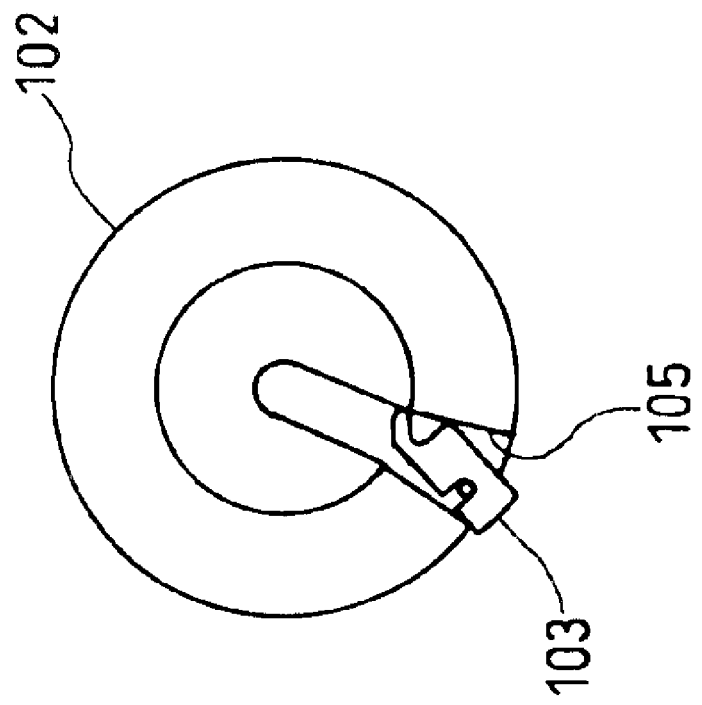
Figure 7B:
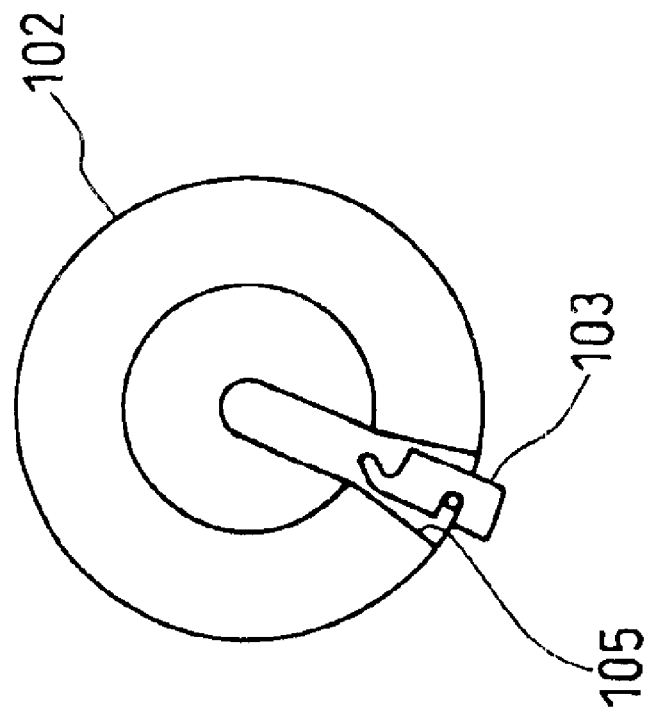

Next, a description will be given of operation in the present embodiment. FIGS. 2 to 4 are views illustrating the operation of the present mechanism. FIG. 2 is a view illustrating the state in which the leader block 3 is drawn out of the tape cartridge 1; FIG. 3 is a view illustrating the state in which the leader block 3 is contained in the take-up reel 2; and FIGS. 4A and 4B are views illustrating the state when the leader block 3 intrudes into the guide groove 5 formed at the take-up reel 2.

First of all, when the tape cartridge 1 is manually set in the present mechanism (i.e., the magnetic tape device), the threading pin 4b, which stands by at a position X, is fitted into the leader block 3 (i.e., into the fitting groove 3a). At this time, the leader block 3 can be freely pivoted on the threading pin 4b (see FIG. 1).

When the leader block 3 is fitted to the threading pin 4b, the threading motor 4a rotates in the axial direction (i.e., in a direction indicated by an arrow S in FIG. 3), so that the threading pin 4b moves toward a position Y from the position X. At this moment, the tip of the threading arm 4 engaged with the leader block 3 moves on the arcuate threading pin trajectory T having a radius substantially equal to the length of the threading arm 4, the center of the threading pin trajectory T being the threading motor 4a.

The back tension is applied from the cartridge motor 1b to the leader block 3 moving on the threading pin trajectory T, i.e., the magnetic tape 1a drawn by the leader block 3 in such a manner as to prevent the magnetic tape 1a from being sagged, as indicated by an arrow BT in FIG. 2. That is to say, the cartridge motor 1b is driven by rotating force resistant against the magnetic tape 1a in the rotating direction.

Subsequently, the leader block 3 passes in front of the guide post G1, the magnetic head H and the guide post G2, and then, is guided to the intrusion port of the guide groove 5 formed at the take-up reel 2. At this time, the orientation of the leader block 3 is substantially the same as that of the tension of the magnetic tape 1a. This is because the leader block 3 is, in a rotating manner, fitted to the threading pin 4b and the back tension is applied to the magnetic tape 1a.

As a consequence, the leader block 3, which has been guided into the vicinity of the intrusion port of the guide groove 5, intrudes with the tip thereof toward the side wall 5c of the guide groove 5, as shown at a position P1 in FIG. 4(b) (see FIG. 4(a)). Namely, in intruding into the guide groove 5, the tip of the leader block 3 abuts against the side wall 5c of the guide groove 5. At this moment, the side wall 5c of the guide groove 5 is formed in such a manner that an angle formed between the side wall 5c and the orientation of the leader block 3 is smaller than that of a side wall 5d in the prior art shown in FIG. 4c, thereby reducing the friction between the side wall 5c and the leader block 3. As a result, the leader block 3 can more smoothly move into the groove 5 (see positions P2 and P3 in FIG. 4(b)).

Moreover, as shown in FIG. 4(b), when the leader block 3 is located at the position P1, the side surface of the leader block 3 abuts against the other side wall 5b of the guide groove 5. In this case, the other side wall 5b is formed into a curved shape, thereby suppressing the friction between the other side wall 5b and the side surface of the leader block 3. Consequently, the leader block 3 can move more smoothly.

Thereafter, the leader block 3 reaches the position P3, that is, the position Y in FIG. 1, where the magnetic tape 1a is taken up in the take-up reel 2.

In this manner, in the present invention, the orientation of the leader block 3 can be corrected by the effect of the shape of the guide groove 5, thereby more reliably achieving the threading operation. Additionally, it is possible to reduce the movement distance of the leader block 3, so as to miniaturize the mechanism and shorten a threading time.

Although the description has been given of the leader block 3 formed into the substantially rectangular shape in the present embodiment, the shape of the leader block 3 is not limited to the above-described shape. The leader block 3 may be formed into a circular shape as long as the leader block 3 can be smoothly inserted into the guide groove 5. Furthermore, the threading arm 4 is not limited to one piece of arm member, and thus, it may be constituted of a link mechanism consisting of two or more arm members. In view of this, the guide groove 5 may be formed into such a shape as to conform to the shape of the leader block 3 or the threading pin trajectory T on the basis of the configuration of the threading arm 4. For example, the side wall 5c of the guide groove 5 may be formed into a curved recess, such as shown by the curved dashed line in FIG. 4b. Consequently, the leader block 3 can more smoothly move.

According to the present invention, with the above-described configuration and functions, the guide groove having the simple shape is formed, so that the leader block is guided to the center of the take-up reel while correcting the orientation of the leader block by the effect of the guide groove, thereby producing excellent effects that the threading operation can be secured and complication of the configuration can be suppressed, which have not been achieved in the prior art.

Here, it is unnecessary to correct the orientation of the leader block along the trajectory of the threading arm, thus simplifying the threading arm, that is, simplifying the configuration of the present mechanism per se, so as to enhance the reliability and reduce the cost. Furthermore, the movability of the threading arm can simplify the threading pin trajectory, thus shortening a time required for the threading operation.

What is claimed is:

1. A tape threading mechanism comprising:
a take-up reel for taking up a magnetic tape within a tape cartridge;
a leader block to be fixed to a tip of said magnetic tape;
a threading arm having a threading pin movable in an arcuate trajectory for moving said leader block from said tape cartridge to said take-up reel; and
a guide groove, provided in said take-up reel, for guiding said leader block toward a take-up center from an intrusion port in the vicinity of an outer periphery of said take-up reel,
wherein on a side wall of said guide groove, outside the arcuate trajectory of said threading pin, a first guide surface is provided,
wherein a second guide surface is provided on the other side wall of said guide groove, said second guide surface having a curved surface portion in the vicinity of the outer periphery of said take-up reel,
wherein said first guide surface includes first and second parts,
wherein said first part of said first guide surface is linear and is provided in the vicinity of said outer periphery of said take-up reel, a surface of said first part is parallel with a center line of said guide groove, and said second part is a curved surface in conformity with the arcuate trajectory of said threading pin, and
wherein said guide groove is arranged so that when introducing said leader block into said intrusion port, a tip of said leader block abuts against said first part of said first guide surface, and a side surface of said leader block abuts against said curved surface portion of said second guide surface.

2. The tape threading mechanism according to claim 1, wherein said second part of said first guide surface is provided in the vicinity of said take-up center.

3. A tape threading mechanism comprising:
a take-up reel for taking up a magnetic tape within a tape cartridge;
a leader block to be fixed to a tip of said magnetic tape;
a threading arm having a threading pin movable in an arcuate trajectory for moving said leader block from said tape cartridge to said take-up reel; and
a guide groove, provided in said take-up reel, for guiding said leader block toward a take-up center from an intrusion port in the vicinity of an outer periphery of said take-up reel,
wherein a first guide surface is provided on a side wall of said guide groove outside the arcuate trajectory of said threading pin, a first part of said first guide surface radially interior to the intrusion port being curved in conformity with the arcuate trajectory of said threading pin, and a second part of said first guide surface in the vicinity of said take-up center being linear,
wherein a second guide surface is provided on the other side wall of said guide groove, said second guide surface having a curved surface portion in the vicinity of the outer periphery of said take-up reel, and
wherein said guide groove is arranged so that when introducing said leader block into said intrusion port, a tip of said leader block abuts against said first guide surface, and a side surface of said leader block abuts against said curved surface portion of said second guide surface.

* * * * *